F. PUENING.
METHOD OF AND APPARATUS FOR CRACKING HYDROCARBONS.
APPLICATION FILED SEPT. 8, 1921.
Reissued Nov. 29, 1921. 15,239.
2 SHEETS—SHEET 1.
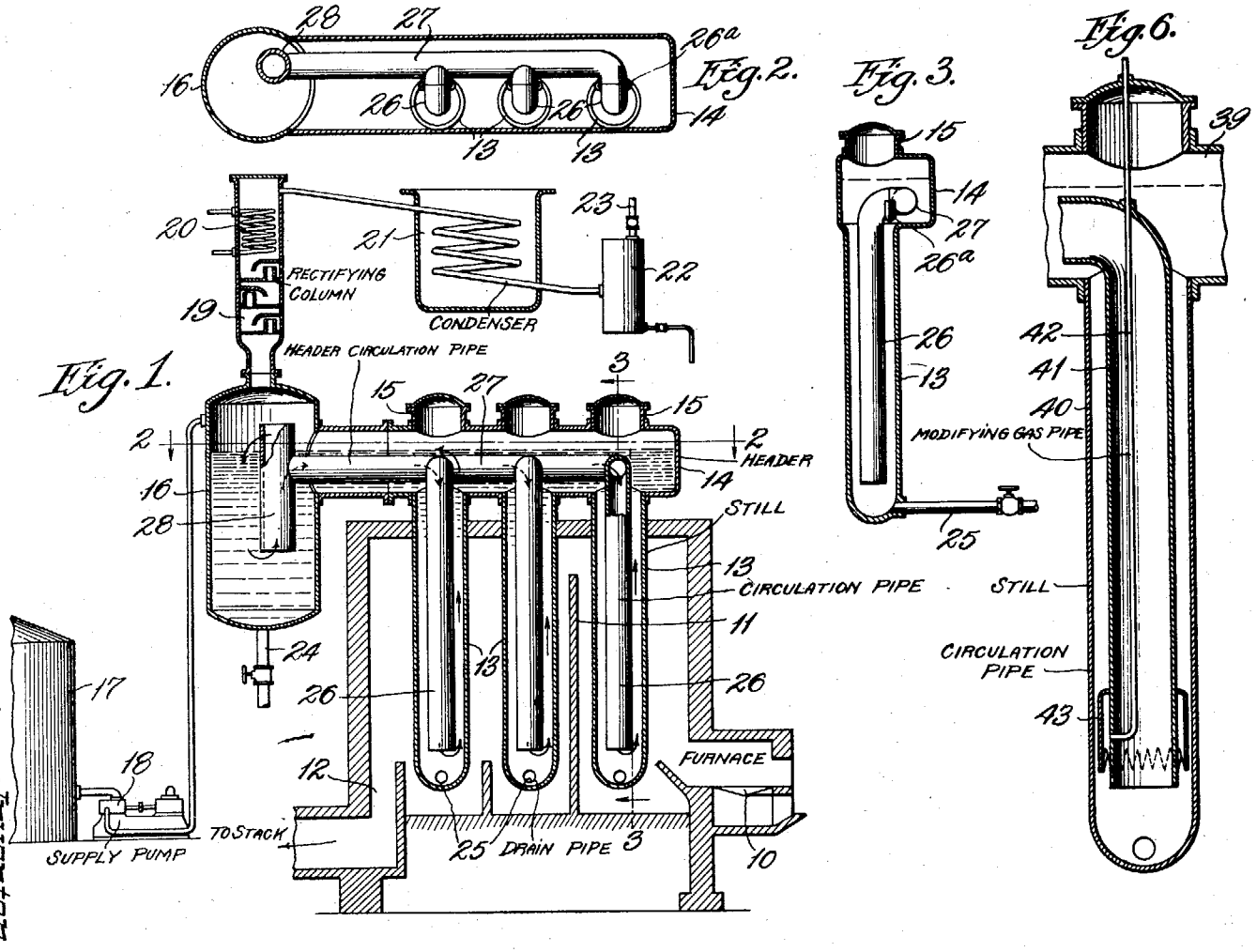
Inventor
Franz Puening,
By: Munday, Clarke & Carpenter,
His Attorneys.

F. PUENING.
METHOD OF AND APPARATUS FOR CRACKING HYDROCARBONS.
APPLICATION FILED SEPT. 8, 1921.
Reissued Nov. 29, 1921. 15,239.
2 SHEETS—SHEET 2.
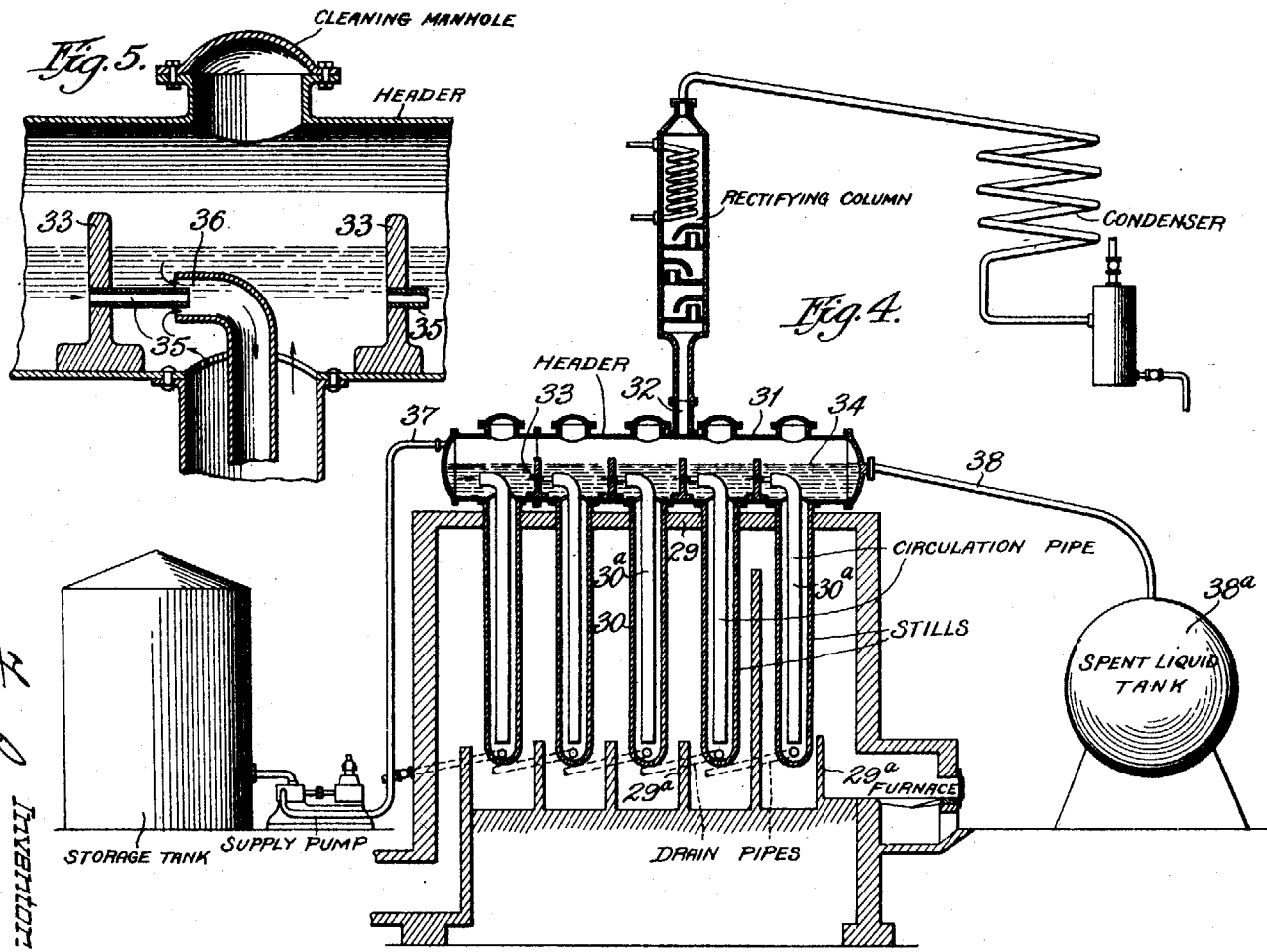
Inventor
Franz Puening,
By: Munday, Clarke & Carpenter,
his Attorneys.

UNITED STATES PATENT OFFICE.

FRANZ PUENING, OF PITTSBURGH, PENNSYLVANIA.

METHOD OF AND APPARATUS FOR CRACKING HYDROCARBONS.

15,239. Specification of Reissued Letters Patent. Reissued Nov. 29, 1921.

Original No. 1,358,174, dated November 9, 1920, Serial No. 138,142, filed December 21, 1916. Application for reissue filed September 8, 1921. Serial No. 499,352.

*To all whom it may concern:*

Be it known that I, FRANZ PUENING, a citizen of Germany, residing in Pittsburgh, county of Allegheny, and State of Pennsylvania, have invented certain new and useful Improvements in Methods of and Apparatus for Cracking Hydrocarbons, of which the following is a specification.

My invention relates to a novel method of and apparatus for cracking petroleum and tars.

The modern practice in the production of gasolene tends toward economy in all branches of the art, and to this end the refiners have considered it desirable to increase the size of the stills or retorts and to distil under higher pressures and temperatures. But these conditions make it impossible to keep the stills in operation more than short periods, with long interruptions, and have increased the hazard to life and property; and an object of the present invention is materially to lengthen the operating period and the productive capacity of the stills, to lessen the hazard of a possible blow-out by lessening and subdividing the quantity of material stored in the still and under the direct action of the heat, and to increase the efficiency of the distilling units.

When cracking a certain percentage of the oil decomposes into carbon and hydrogen, which percentage increases rapidly with higher temperatures and pressures, the carbon precipitating on the nearest available surface, preferably horizontal ones. The deposition of carbon is the greatest foe of the distiller; it acts as an insulator, checking the transmission of heat into the liquid and consequently raising the temperature of the shell. In view of the fact that the distillation is done under pressure, the likelihood of failure of the shell is great. Furthermore, as the still must be cooled down frequently to remove carbon, other strains, due to expansion and contraction, are added, particularly affecting the seams. The larger the stills, the greater is the strain and danger. The new still, however, can be built in any desired size, without increasing the strain or the amount of oil liable to loss in case of a blow-out. To make this possible a new method of circulating the oil in the still was devised, which is as follows:

The heating of hydrocarbons to the cracking stage results in the formation of a multitude of gas bubbles, which, due to their light weight, have a tendency to rise rapidly to the surface of the body of the liquid. The formation of these bubbles also results in the lessening of the weight of a given body of the liquid and enables the utilization of the thermo-siphonic principle and also the principle of the air-lift pump to effect rapid circulation. The higher speed of circulation results in greater productive capacity; it enables the use of a higher liquid temperature without higher shell temperature, which is very essential.

The invention is embodied in certain apparatus, exemplifications of which are shown and in which a plurality of long, vertically disposed tubes or cylinders of relatively small cross-sectional area are connected to a header or communicating container at their upper ends, heat being applied only to the vertical walls of the cylinders. Associated with each tube or still is an axially disposed pipe which terminates short of the lower end of the still and is of such diameter as to leave only a relatively small space between it and the vertical walls of the still. The upper end of the axially disposed pipe is connected to an adjacent body of liquid from which the gas bubbles have been released. When heat is applied to the walls of the stills, intermediate their ends, the liquid between the walls of the inner and outer pipes is caused to rise rapidly to the top under the air-lift pump principle and thermo-siphonic action and to be replaced by liquid supplied through the central pipe.

Very rapid distillation follows the use of such apparatus for the reason that a thin body of liquid is constantly under the action of a relatively high heat, the liquid being caused to circulate by the action of the heat itself. Thus overheating is less likely to occur; this for the reason that the speed of circulation is a function of the heat applied.

The important advantage of such construction is that the units can move independently, no liquid in one still can get lost when its neighbor still blows out; that no other means, such as protecting jackets, are necessary to avoid local superheating of the retorts; that the still has no heating surfaces on which there is a downwardly flowing current; nor is there a direct heating action on any quiet or horizontal surface. The carbon deposits on the heating surfaces are reduced to a minimum, first, for the reason that carbon does not readily deposit on vertical surfaces, and, second, because of the scouring action of the rapidly circulating body of liquid.

A still further advantage in the use of such apparatus is that steam or gas may be supplied to the bottom of the still in the space between the two tubes with the assurance of thorough contact with every particle of the liquid under the action of the heat and at the exact point where readjustment of the atoms takes place. Furthermore, the speed of circulation may be increased or lessened by controlling the force and amount of gas admitted.

Further advantages will be pointed out hereinafter in connection with the specific description of the apparatus and method of operating the same.

The apparatus and method of operating the same will be better understood in connection with the accompanying drawings, in which:

Figure 1 is a sectional view, diagrammatic in character, of a form of apparatus suitable for carrying out my invention;

Fig. 2 is a sectional view on the line 2—2 of Fig. 1;

Fig. 3 is a sectional view on the line 3—3 of Fig. 1;

Fig. 4 is a view similar to Fig. 1, showing a slightly modified form of the apparatus;

Fig. 5 is an enlarged sectional view of a fragmentary portion of the apparatus shown in Fig. 4; and Fig. 6 is an enlarged vertical sectional view showing an addition to the apparatus illustrated in the preceding figures.

Referring more particularly to Fig. 1, it will be seen that a hearth 10 is provided, on which fuel is placed for combustion. The heated gases are caused to flow upwardly and over the baffle 11, escaping through the stack-flue 12. In a suitable setting are mounted the stills or retorts of my invention, three of such stills being shown in Fig. 1. Each thereof comprises a cylindrical shell or tube 13, relatively long and of small cross-sectional area, each of the retorts communicating at its upper end with a header or container 14. The header is provided with suitable outlets or manholes 15. The header is in open communication with a container 16, of relatively large capacity, located adjacent to the stills, and preferably so arranged that the bulk of the liquid carried thereby is below the header and therefore below the open upper ends of the stills. The supply of untreated petroleum or tar may be obtained from a tank or container indicated at 17, the material being supplied through the agency of the pump 18. Connected to the container 16 at its upper end is a rectifying column 19 and a dephlegmator 20, these being employed for a well known purpose. The uncondensed gas then passes into a condenser 21, the condensed liquid being received by the tank 22. A loaded valve 23 provides for the escape of any high-pressure gas.

Provision is made, by reason of the outlet 24 to the container 16, for draining the same, while similar drain outlets 25 are provided for the stills.

As a means for causing a rapid circulation of the liquid, I provide in each of the stills the axially disposed pipes 26, the lower ends of which terminate just above the lower ends of the stills, and the upper ends of which connect with a header pipe 27. This pipe extends horizontally through the header 14 and terminates in a T 28, the open lower end of which is in the lower portion of the circulation tank 16. The heat is caused to impinge upon vertical surfaces only; and carbon is least disposed to deposit on such surfaces. The application of heat to the liquid in this manner causes the cracking and generation of the lighter hydrocarbons, which, in a multitude of bubbles, rise rapidly to the surface. Following the principle of the air-lift pump, the liquid is also caused to rise rapidly and to draw in a corresponding volume of liquid from which the gas has been expelled but which should again pass over the heating surfaces. The rising column gives off its gas, which passes over a relatively large surface of liquid in its passage toward the condenser. After the liquid is freed of the gas it is withdrawn from its location and supplied to the lower ends of the stills. A constant circulation is therefore effected. Untreated liquid is supplied either constantly or at intervals through the agency of the pump, the residue remaining in the stills and circulating tank until such time as the carbon deposit in the stills becomes too great, whereupon the apparatus is drained and the carbon cleaned.

In the apparatus shown in Figs. 4 and 5, arrangement is made for continuous operation, that is, the residue is constantly discharged, with the addition of a proper quantity of undistilled liquid. In that apparatus the setting 29 may be much the same as that heretofore referred to, and the stills 30 are substantially identical with those shown in Fig. 1. This is likewise true of the circulating pipe $30^a$. However, the upper end arrangement of the stills is different. The stills open into a header 31, to which the condenser connection 32 is made, the header being divided into a plurality of sections by means of partitions 33. These partitions do not close off the upper portion of the header, but extend somewhat above the normal liquid line in the header, this line being indicated by the dotted line 34. The liquid connection between adjacent sections is, as best shown in Fig. 5, through the agency of the small pipe 35, which passes through the partition and enters into the large open end 36 of the circulation pipe 30[a]. Fresh liquid is supplied through the pipe 37, either continuously or at intervals, and spent liquid is discharged through the pipe 38. It will be noted that the liquid is caused to pass consecutively through each of the stills, the rising column of heated liquid simultaneously drawing in a quantity of liquid from the adjacent section. A disadvantage in a construction such as this is in that the last stills receive only liquid which is practically spent and that the carbon deposit is likely to be much greater in those stills. Preferably the entire body of liquid is circulated as described in connection with the apparatus at Fig. 1, in order that the carbon deposited may be equalized.

In the construction shown in Fig. 6 the header 39, still 40, and circulation pipe 41 may be the same as described in connection with either of the two preceding forms. In addition, however, I have entered a small pipe 42 through the vertical pipe, terminating the small pipe underneath a notched apron 43 at the lower end. Steam or a suitable gas may be supplied through the small pipe and caused to combine with the current of liquid under the action of the heat. This may be practised either for the purpose of modifying the formation of new hydrocarbon combinations, or for the purpose of increasing the speed of circulation. At any rate, the gas is supplied at the exact point needed.

By reason of the use of apparatus such as described, it will be seen that the heat is directly applied only to vertical surfaces and that the bulk of the carbon will be kept in suspension until it settles in the container 16, where the speed of the liquid is very small, or at the lower end of each still, out of direct contact with the heat, or it may leave through pipe 38: that the different still units are of relatively small capacity, while providing for constant rapid circulation, yet the total volume of liquid which may escape in the event of a blow-out, is relatively small; that the still units, being supported in the manner described, by their contraction and expansion cannot throw any strain into the system. Therefore apparatus with a practically unlimited number of retorts can be built: it is apparent that the stills may be readily freed of their carbon deposits when occasion requires: that there is no necessity for regular feeding, as the circulation is independent of the amount of oil fed in and as no danger follows a not too great variation of the level. There is no necessity for placing an air or steam jacket around the stills, reducing their capacity; there are no heating surfaces on which the liquid flows downwardly. Worn out retorts can be replaced easily.

The apparatus and process described are of course typical only. The dimensions and arrangement are not essential, and modifications may be made both in the method and apparatus without departure from the spirit of my invention.

The apparatus and process may also be used for treating substances which involve similar difficulties in their treatment, the invention being especially useful for the treatment of coal tar, or other such materials as contain much free carbon.

I claim:

1. In apparatus of the character described, the combination of a vertically disposed still and means for maintaining a body of incompletely cracked liquid at a point adjacent to such still, a conduit connecting said body of liquid to the lower end of said still, the space between the walls of the still and the exterior of such conduit being relatively small, and means for supplying a gas or vapor to the bottom of the conduit in order to accentuate circulation, or decomposition, substantially as described.

2. The method of cracking petroleum, which consists in separating the bubbles from each still in an individual space adjacent that still, and forcibly directing substantially all the densified liquid from said space into the circulating pipe of the next still, penetrating the annular ring of that still, thereby creating a current of liquid through all the stills in succession, substantially as described.

3. The method of treating petroleum, which consists in subjecting an annular column thereof to a cracking heat, and thereby causing a rapid circulation thereof and supplying a modifying gas to a lower portion of the column, substantially as described.

4. The method of treating petroleum, which consists in maintaining a vertical, annular column of liquid, applying a cracking heat to the sides of the column, renewing the liquid by delivering other liquid downwardly in the center of the column and supplying a fluid at a point near the lower end of the column whereby the entire body of liquid under treatment is brought in contact with the fluid, substantially as described.

5. In means for cracking petroleum, the combination of a cylindrical vertical boiler freely suspended within a space to be heated, the heat being directly applied only at points intermediate the ends of the boiler, the space at the top of the boiler being of increased size whereby a body of liquid may be maintained, and a circulation pipe axially located in said boiler, the upper end of the pipe being laterally bent and caused to terminate in said enlarged space at a point removed from the upper end of the cylindrical portion of the boiler, substantially as described.

6. In means for cracking petroleum, the combination of a header containing a body of liquid, a plurality of vertical cylinders freely suspended from said header, means for directly applying heat to an intermediate portion only of said cylinders, a centrally located circulation pipe in each of said cylinders, the entrance end of said circulation pipe terminating at one side of the rising column of liquid from said cylinder, whereby the liquid supplied to the circulation pipe is withdrawn from a quiet porton of the body of liquid, substantially as described.

7. In means for cracking petroleum, the combination of a plurality of relatively large vertical cylinders, a header within which the upper ends of the cylinders terminate, a furnace within which the cylinders are freely suspended, the parts being arranged in such manner that heat is directly applied only to vertical surfaces, a circulation pipe in each cylinder, the entrance end of the circulation pipe being so located as to withdraw liquid from a point removed from the upper end of the cylinders, substantially as described.

8. In a petroleum still, the combination of a header, a plurality of cylinders depending from said header, means for directly supplying heat to the intermediate vertical portions only of said cylinders, and means for supplying the liquid for circulation in said cylinders by delivering the same downwardly through the axis of said cylinders, the liquid delivered downwardly being withdrawn from an adjacent body of quiet liquid at a point removed from the point of violent agitation, substantially as described.

9. In means for cracking petroleum, the combination of a header and a plurality of relatively large, vertical stills, means for freely suspending said stills within a heated area, the lower ends of the stills being protected from high heat, an adjacent container for a large amount of liquid, and a circulation pipe located within each of said stills and connected through the header with said container, whereby the liquid is withdrawn from the container and delivered to the lower end of the stills without material heat loss and without being brought into contact with a directly heated surface, substantially as described.

10. In means for cracking petroleum, the combination of a header, a vertical still freely depending therefrom, an adjacent bulk container, and a circulation pipe in said still, said pipe terminating in said container, said still and container being connected only at their upper ends whereby the parts may freely expand and contract without strain, substantially as described.

11. The method of cracking petroleum, which consists in maintaining a vertical annular column of liquid, supplying a cracking heat to the sides of the column thereby causing a rapid upward movement of the column, maintaining a separate body of liquid at a point removed from said rising column, withdrawing liquid from said separate body and delivering same downwardly through the center of said column to the lower end thereof and leading fresh liquid into the center of said column, substantially as described.

12. In means for cracking petroleum, the combination of a plurality of connected stills, circulation pipes in said stills for effecting rapid circulation of the body of liquid in each still, means for supplying fresh liquid to the circulation pipe of the first still, means for forcibly directing the residue from the first still into the circulation pipe of the next still and finally removing the spent residue from the apparatus, whereby all the liquid which enters the stills is forced to pass successively through all of the stills before leaving the apparatus, substantially as described.

13. Means for cracking petroleum, comprising in combination a plurality of freely depending stills of relatively large size, means for providing an enlarged liquid containing space at the upper end of each still, a circulation pipe in each still, said pipes communicating with and being adapted to draw liquid from the space at the top of another still, substantially as described.

14. In means for cracking petroleum, the combination of a header, a plurality of stills freely depending therefrom, partition walls in said header whereby a space is provided at the top of each still, a circulation pipe in each still, said pipe being laterally bent at its upper end and communicating through a partition wall with the space at the upper end of another still, substantially as described.

15. The method of cracking petroleum, which consists in separating the bubbles from each still in an individual space adjacent that still, and forcibly directing substantially all the densified liquid from said space into the circulating pipe of another still, penetrating the annular ring of material in the last named still, thereby creating a current of liquid through all the stills in succession, substantially as described.

16. The method of cracking hydrocarbons, which consists in separating the bubbles from each still in an individual space adjacent that still, and forcibly directing substantially all the densified liquid from said space into the circulating pipe of the next still, penetrating the annular ring of that still, thereby creating a current of liquid through all the stills in succession, substantially as described.

17. The method of treating hydrocarbons, which consists in subjecting an annular column thereof to a cracking heat, and thereby causing a rapid circulation thereof and supplying a modifying gas to a lower portion of the column, substantially as described.

18. The method of treating hydrocarbons, which consists in maintaining a vertical, annular column of liquid, applying a cracking heat to the sides of the column, renewing the liquid by delivering other liquid downwardly in the center of the column and supplying a fluid at a point near the lower end of the column whereby the entire body of liquid under treatment is brought in contact with the fluid, substantially as described.

19. In means for cracking hydrocarbons, the combination of a cylindrical vertical boiler freely suspended within a space to be heated, the heat being directly applied only at points intermediate the ends of the boiler, the space at the top of the boiler being of increased size whereby a body of liquid may be maintained, and a circulation pipe axially located in said boiler, the upper end of the pipe being laterally bent and caused to terminate in said enlarged space at a point removed from the upper end of the cylindrical portion of the boiler, substantially as described.

20. In means for cracking hydrocarbons, the combination of a header containing a body of liquid, a plurality of vertical cylinders freely suspended from said header, means for directly applying heat to an intermediate portion only of said cylinders, a centrally located circulation pipe in each of said cylinders, the entrance end of said circulation pipe terminating at one side of the rising column of liquid from said cylinder, whereby the liquid supplied to the circulation pipe is withdrawn from a quiet portion of the body of liquid, substantially as described.

21. In means for cracking hydrocarbons, the combination of a plurality of relatively large vertical cylinders, a header within which the upper ends of the cylinders terminate, a furnace within which the cylinders are freely suspended, the parts being arranged in such manner that the heat is directly applied only to vertical surfaces, a circulation pipe in each cylinder, the entrance end of the circulation pipe being so located as to withdraw liquid from a point removed from the upper end of the cylinders, substantially as described.

22. In a hydrocarbon still, the combination of a header, a plurality of cylinders depending from said header, means for directly supplying heat to the intermediate vertical portions only of said cylinders, and means for supplying the liquid for circulation in said cylinders by delivering the same downwardly through the axis of said cylinders, the liquid delivered downwardly being withdrawn from an adjacent body of quiet liquid at a point removed from the point of violent agitation, substantially as described.

23. In means for cracking hydrocarbons, the combination of a header and a plurality of relatively large, vertical stills, means for freely suspending said stills within a heated area, the lower ends of the stills being protected from high heat, an adjacent container for a large amount of liquid and a circulation pipe located within each of said stills and connected through the header with said container, whereby the liquid is withdrawn from the container and delivered to the lower end of the stills without material heat loss and without being brought into contact with a directly heated surface, substantially as described.

24. In means for cracking hydrocarbons, the combination of a header, a vertical still freely depending therefrom, an adjacent bulk container, and a circulation pipe in said still, said pipe terminating in said container, said still and container being connected only at their upper ends whereby the parts may freely expand and contract without strain, substantially as described.

25. The method of cracking hydrocarbons, which consists in maintaining a vertical annular column of liquid, supplying a cracking heat to the sides of the column thereby causing a rapid upward movement of the column, maintaining a separate body of liquid at a point removed from said rising column, withdrawing liquid from said separate body and delivering same downwardly through the center of said column to the lower end thereof and leading fresh liquid into the center of said column, substantially as described.

26. In means for cracking hydrocarbons, the combination of a plurality of connected stills, circulation pipes in said stills for effecting rapid circulation of the body of liquid in each still, means for supplying fresh liquid to the circulation pipe of the first still, means for forcibly directing the residue from the first still into the circulation pipe of the next still and finally removing the spent residue from the apparatus, whereby all the liquid which enters the stills is forced to pass successively through all the stills before leaving the apparatus, substantially as described.

27. Means for cracking hydrocarbons, comprising in combination a plurality of freely depending stills of relatively large size, means for providing an enlarged liquid containing space at the upper end of each still, a circulation pipe in each still, said pipes communicating with and being adapted to draw liquid from the space at the top of another still, substantially as described.

28. In means for cracking hydrocarbons, the combination of a header, a plurality of stills freely depending therefrom, partition walls in said header whereby a space is provided at the top of each still, a circulation pipe in each still, said pipe being laterally bent at its upper end and communicating through a partition wall with the space at the upper end of another still, substantially as described.

29. The method of cracking hydrocarbons, which consists in separating the bubbles from each still in an individual space adjacent that still, and forcibly directing substantially all the densified liquid from said space into the circulating pipe of another still, penetrating the annular ring of material in the last named still, thereby creating a current of liquid through all the stills in succession, substantially as described.

In testimony whereof I have hereunto set my hand this 2. day of September, 1921.

FRANZ PUENING.